Dec. 12, 1967     B. POPP ET AL     3,357,994
PROCESS FOR CONTINUOUSLY DEHYDRATING AND/OR
REMOVING WATER FROM ORGANIC COMPOUNDS
Filed Sept. 7, 1965
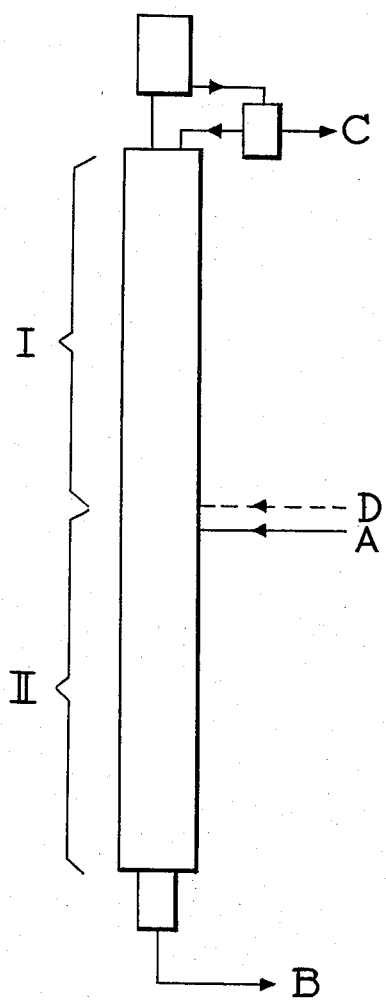
INVENTORS
*BERNHARD POPP*
*ULFERT ONKEN*
BY
ATTORNEYS

United States Patent Office 3,357,994
Patented Dec. 12, 1967

3,357,994
PROCESS FOR CONTINUOUSLY DEHYDRATING AND/OR REMOVING WATER FROM ORGANIC COMPOUNDS
Bernhard Popp, Neuenhain, Taunus, and Ulfert Onken, Kelkheim, Taunus, Germany, assignors to Farbwerke Hoechst Aktiengesellschaft vormals Meister Lucius & Bruning, Frankfurt am Main, Germany, a corporation of Germany
Filed Sept. 7, 1965, Ser. No. 495,003
Claims priority, application Germany, Mar. 1, 1962, F 36,155
5 Claims. (Cl. 260—327)

This application is a continuation-in-part of our earlier, co-pending application, Ser. No. 260,994 filed in Feb. 26, 1963, now abandoned.

It is known that water can be thermally split off from organic compounds in the presence of a liquid forming an azeotrope with water and that the azeotropic mixture of water and the liquid can be distilled off. In this manner organic dicarboxylic acids can be transformed into their anhydrides.

For transforming maleic acid into maleic anhydride a process is known in which xylene is used as entrainer for the water. Because of the poor solubility of maleic acid in xylene, the dehydration does not take place in homogeneous solution but in a heterogeneous multiphase mixture of xylene, solid and molten maleic acid, maleic anhydride and water. Moreover, in this process the maleic acid is wetted by the xylene to a very small extent only, so that a complete dehydration requires long residence times. This may involve undesired side reactions, such as rearrangement of maleic acid into fumaric acid and formation of polymers. These by-products often enclose unreacted solid maleic acid and, because of their poor solubility, they lead to contaminations and depositions which cause obstructions. Thus, this process cannot be carried out in continuous manner without trouble. When it is carried out in discontinuous manner, the aggregates must often be cleaned because of the depositions mentioned above.

The above difficulties are encountered not only in the maunfacture of maleic anhydride but also generally in processes in which water is split off from organic compounds in the presence of an entrainer, irrespective of the type of the starting material in each case. The entrainer must have so high a boiling point that the dehydration takes place with a sufficient speed. However, at these, mostly relatively high, temperatures the final products are already volatile to a noticeable extent so that they partially distill off together with the water azeotrope, for example maleic anhydride with the azeotrope of xylene and water. In re-condensing the distillate, the anhydride and water again form dicarboxylic acid. The dilute aqueous carboxylic acid solutions thus obtained must be concentrated before being re-used, which is expensive and may involve material losses. In the concentration maleic acid, for example, partially forms fumaric acid and is then lost for the dehydration.

In order to avoid the above difficulties, it has already been suggested to dehydrate maleic acid in a high boiling solvent having a boiling point of at least 200° C. and to separate the water split off by azeotropic distillation with a readily boiling hydrocarbon or halo-hydrocarbon over a small column. As suitable high boiling solvents there have been proposed especially esters, ethers, hydrocarbons and chlorohydrocarbons. Since, after the dehydration, the maleic anhydride, which has a boiling point of 202° C., is generally separated from the solvent by distillation, solvents having a boiling point of at least 230° C. should be used.

The above process cannot be carried out in continuous manner for various reasons. First of all, solid anhydrous maleic acid must be used. Aqueous maleic acid solutions as obtained in the oxidation of suitable hydrocarbons to obtain maleic acid on an industrial scale can only be processed after having been completely concentrated by evaporation. In the evaporation, part of the maleic acid forms fumaric acid, which is lost for the dehydration. Still further, in the course of the reaction, the reaction vessel contains a heterogeneous mixture of maleic acid, maleic anhydride, solvent and azeotrope component. Finally, it is disadvantageous that the reaction takes several hours so that low space-time-yields of anhydride are obtained. With some of the proposed solvents, namely the esters, the danger of an ester interchange with the anhydride formed exists.

The present invention provides a process for continuously dehydrating organic compounds at a temperature in the range of 20 to 350° C., preferably 70 to 250° C. and more preferably 120 to 250° C., in a first organic liquid acting as solvent and having a boiling point which is at least about 20° C. and preferably upwards of 40° C. below that of the dehydrated final product, the water is removed as an azeotrope together with a second organic liquid acting as entrainer and having a lower boiling point than the first organic liquid, and the anhydride is isolated.

In the present specification by "dehydration" there is to be understood the splitting off of water from organic compounds with the formation of the corresponding anhydrides, including the physical separation of water from aqueous solutions of organic compounds or from moist organic compunds, e.g., the removal of water from an aqueous solution of maleic acid prior to transformation of the acid to the anhydride. The term "reaction" comprises the dehydration and the "reaction zone" is the space where the dehydration takes place.

The process is preferably carried out in a distilling column which contains in the lower part the boiling solvent and in the upper part the boiling entrainer. The organic substance to be dehydrated is continuously introduced into the center portion of the column. Water is continuously removed from the head of the column and the dehydrated compound is withdrawn from the sump of the column.

According to the continuous process of the invention, diverse dehydration reactions may be carried out. The process is especially suitable for dehydrating bi- or polyfunctional organic compounds, the dehydration products of which are stable at the reaction temperatures and which are soluble in one of the solvents defined below. These compounds include especially organic compounds having at most 10 carbon atoms and containing two functional groups, one of which is a carboxyl group, the second functional group being a carboxyl group, a hydroxyl group, a sulfonic acid group, a primary amino group or a secondary amino group, and in which these are two or three carbon atoms between the two functional groups, particularly aliphatic or aromatic dicarboxylic acids which, upon dehydration are transformed into the corresponding dicarboxylic anhydrides, for example maleic acid, citraconic acid, phthalic acid, succinic acid, and glutaric acid. The dehydration of maleic acid and citraconic acid is particularly preferred. It is likewise possible, however, to dehydrate o-sulfobenzoic acid. In this case $H_2O$ is split off from a carboxyl and a sulfonic acid group with the formation of the cyclic anhydride. Hydroxy-carboxylic acids react with intra- or intermolecular splitting off of water from hydroxyl and carboxyl groups. For example, $\gamma$- and $\delta$-hydroxycarboxylic acids can be continuously transformed into $\gamma$- and $\delta$-lactones and $\alpha$-hydroxycarboxylic acids can be transformed into the corresponding lactides. Still further, by the process of the invention water can be split off from compounds which, besides a carboxyl group, contain a primary or secondary amino group, particularly an alkylamino group. The corresponding N-alkyl-phthalimides can be produced, for example, from phthalamide acids such as N-methyl, N-ethyl-, N-butyl- and N-hexyl-phthalamide acid. The dehydration of organic compounds, the cyclic anhydrides of which contain 5 or 6 ring members, is especially suitable.

The process of the invention can be used not only for dehydrating organic compounds carrying suitable substituents mentioned above but also for continuously removing water in a physical way from substance mixtures of one or several organic substances and water, particularly from aqueous solutions or suspensions. Furthermore, it is possible to treat by the process of the invention an organic compound in aqueous solution or in moist state and to perform in the same apparatus, either successively or simultaneously, the physical removal of water present as solvent or mixing component and the dehydration of the organic compound. Consequently, the compounds to be dehydrated, for example maleic acid, need not be used in anhydrous form, they may be moist or can be used in the form of aqueous solutions. It is suitable of course, but not necessary in all cases, previously to concentrate the aqueous solutions before they are treated according to the process of the invention.

An advantage of the process of the invention resides in that temperature-sensitive and chemically labile compounds or hydrous mixtures can be dehydrated under mild conditions when an appropriate solvent is used and a suitable temperature is applied.

Under the operating conditions of the preferably used column, the boiling point of the organic solvent used in the reaction zone must be so high that the dehydration or the removal of water is rapid enough. It should be terminated after a residence time of the organic compounds in the reaction zone of at most three and preferably at most two hours. The boiling point of the solvent should be at least about 20° C. lower than that of the dehydration products or the products freed from water in order to facilitate separation of the solvent from the end product. Moreover, the solvent should permit an easy distillative removal of the water from the reaction zone, and it should be readily separable from the final product of the reaction. Particularly, it should have a good dissolving power for all reactants, i.e. the starting products, final products and by-products, if any, so that a homogeneous solution is obtained.

Solvents which meet the above conditions are preferably straight chain or branched aliphatic monocarboxylic acids, especially propionic acid, n- and iso-butyric acid, iso-valeric acid and trimethylacetic acid, but also other aliphatic carboxylic acids having 3 to 6 carbon atoms. Furthermore can be used ethers, especially dialkyl ethers having 6 to 12 carbon atoms, for example di-n-propyl ether and diisoamyl ether; acyclic ketones preferably having up to 12 carbon atoms, for example methylethyl ketone, diethyl ketone and diisopropyl ketone; cyclic ketones, especially those which derive from cyclopentane and cyclohexane or the homologs thereof, for example cyclopentanone and cyclohexanone; as well as nitriles.

As entrainer for the water there can be used substances having a lower boiling point than the solvent used, in general above 0° C. and preferably above 30° C. and forming low boiling azeotropes, advantageously hetero-azeotropes with water. Neither solvent nor final product shall be removed from the top of the column with the entrainer this always being possible with an appropriate selection of solvent and entrainer. Suitable entrainers are, above all, hydrocarbons having 5 to 10 carbon atoms, especially saturated aliphatic and cycloaliphatic hydrocarbons such as hexane, heptane, cyclohexane, gasoline fractions as well as aromatic hydrocarbons such as benzene and toluene. Furthermore, there can be used halohydrocarbons, especially those of the aliphatic series which contain one or two carbon atoms and at least two chlorine atoms and which may be saturated or olefinically unsaturated, for example carbon tetrachloride, 1,2-dichloro-ethane, 1,2-dichloro-ethylene, trichlorethylene, and other inert organic liquids.

The anhydride is continuously withdrawn from the sump of the column. If by-products have been formed in the reaction, which are soluble in the solvent but not in the final product, the crude final product is to be withdrawn from the sump with such a content of solvent that all by-products are withdrawn from the column. Final products which are especially labile are suitably withdrawn as a dilute solution in the solvent. In either case the concentration of the solvent is adjusted in the withdrawn product by the withdrawal speed of the product and the solvent is continuously replenished. It is preferred, of course, to withdraw the final product without solvent.

The process of the invention is especially suitable for the preparation of maleic anhydride from maleic acid. In this case isobutyric acid is an excellent solvent for all components participating in the dehydration, namely maleic acid, maleic anhydride, fumaric acid, water, polymers and other by-products. The reaction takes place in homogeneous phase and no undesired depositions occur which disturb or render impossible the continuous process. Furthermore, the use of isobutyric acid enables aqueous crude maleic acid solutions to be continuously introduced into the apparatus in an especially suitable manner. The isobutyric acid takes up the aqueous solution so that the concentration of the solution and the dehydration of the maleic acid can be carried out under mild conditions and do not need long periods of time. Owing to its high volatility in boiling isobutyric acid, the water rapidly travels upwards from the reaction zone to the entraining zone where it readily forms an azeotrope with the entrainer, which azeotrope is then withdrawn from the column.

The accompanying drawing illustrates by way of example an apparatus for carrying out the process of the invention. A common plate-type rectifying column is operated as follows: the solvent used for dehydrating or removing the water boils in the lower part of the column (reaction zone II). The upper part of the column (entraining zone I) contains a suitable, readily boiling entrainer which forms a low boiling azeotrope with water. The substance to be dehydrated or freed from water is continuously supplied through conduit A at the upper end of the reaction zone. Owing to its higher volatility, the water is carried from the reaction zone to the above entraining zone. In this zone the water forms an azeotrope with the entrainer. It is then withdrawn at the head of the column, condensed, separated from the entrainer and removed at C. The entrainer is recycled into the column. Owing to its lower volatility, as compared with the solvent, the anhydride formed in the reaction zone passes to the lower part of the column and from there to the sump, where it is withdrawn at B. If the plates in the reaction zone are not sufficient for completely separating anhydride and solvent, a crude anhydride is obtained at B, which still contains some solvent. It must be purified by known methods, for example by distillation. The amount of solvent discharged with the crude anhydride must then be replenished at D.

It is especially suitable to use a plate-type column in the process of the invention, but it is likewise possible to use other columns, for example a packed column. It may be necessary especially when aqueous solutions are used, additionally to heat the upper part of the reaction zone.

In general, the reaction is carried out at atmospheric pressure, but it is likewise possible to operate under reduced pressure, for example under a pressure of 100 mm. of mercury, or under elevated pressure, for example a pressure of up to 10 atmospheres.

In addition to the great advantage of using a solvent enabling the dehydration or the removal of water to be carried out in homogeneous phase, the process of the invention offers the further advantage of a short residence time of the reactants in the reaction zone, whereby high space-time yields are obtained. It is thus possible to treat more sensitive substances, too, because the short residence time permits the application of mild conditions. Undesired side reactions are suppressed, for example the transformation of maleic acid into fumaric acid in the dehydration of maleic acid. A further advantage resides in that the water is rapidly removed from the reaction mixture and distilled off as azeotrope without part of the reaction product being entrained. The reaction product is quantitatively obtained from the sump of the column. If a suitable column is used, it is substantially free from solvent.

The following examples serve to illustrate the invention but they are not intended to limit it thereto.

*Example 1*

In a plate-type column, as illustrated by the drawing, a mixture of benzene (boiling point 80.1° C.) and isobutyric acid (boiling point 154.5° C.) was refluxed. After the liquids had separated in the column into zone I (benzene) and zone II (isobutyric acid), according to their volatility, a solution of 70 parts of commercial maleic acid in 35 parts of water was introduced through inlet A into the upper part of zone II. The water, which originated partially from the aqueous solution and partially from the dehydration, was condensed at the head of the column together with the benzene, the organic phase (benzene) was separated and the water was withdrawn at C. The benzene was recycled into the column. From the sump a mixture of maleic anhydride and a little isobutyric acid was withdrawn. In order to maintain the concentration of isobutyric acid in zone II the corresponding amount of isobutyric acid was supplied through inlet D.

After an equilibrium state had been reached, the column was operated under the following conditions:

(a) supply of aqueous maleic acid solution (of 66.7% strength) 171 grams per hour, corresponding to 114 grams per hour of commercial maleic acid and 57 grams per hour of water;
(b) temperature at the head of the column: 71° C;
(c) discharge at the head of the column: 74.5 grams of water per hour;
(d) discharge from the sump of the column: 102 grams of crude maleic anhydride per hour, contaminated with 5–6% of isobutyric acid;
(e) supply of isobutyric acid: 5.5 grams per hour.

The crude maleic anhydride contained less than 2% of fumaric acid, in most cases the content varied between 1 and 2%. A content of polymer could not be detected. The water withdrawn at the head of the column was free from maleic acid.

*Example 2*

Two zones were formed in a plate-type column as described in Example 1 by distilling with total reflux a mixture of benzene and isobutyric acid. A solution of 70 parts of pure maleic acid in 35 parts of water was introduced into the upper part of the isobutyric acid zone II. The water was withdrawn at the head and the anhydride from the sump of the column as described in Example 1.

In the equilibrium state the column was operated under the following conditions:

(a) supply of aqueous maleic acid solution (66.7% strength), 102 grams per hour, corresponding to 68 grams per hour of pure maleic acid and 34 grams per hour of water;
(b) temperature at the head of the column: 73° C.;
(c) discharge at the head of the column: 44.5 grams of water per hour;
(d) discharge from the sump of the column: 58.5 grams per hour of crude maleic anhydride containing 1–2% of isobutyric acid;
(e) supply of isobutyric acid: 1 gram per hour.

The crude maleic anhydride contained, on the average, 1% of fumaric acid. A content of polymer could not be detected. The water withdrawn at the head of the column was free from maleic acid.

*Example 3*

In a plate-type column, as used in Example 1 two zones were formed by distillation of a mixture of benzene and isobutyric acid with total reflux. A solution of 50 parts of o-sulfobenzoic acid in 50 parts of water was introduced into the upper part of the isobutyric acid zone. As described in Example 1, the water was withdrawn at the head of the column and from the sump a mixture of o-sulfobenzoic anhydride and isobutyric acid was discharged. For maintaining the concentration of isobutyric acid in zone II the corresponding amount of isobutyric acid was introduced via inlet D.

In the equilibrium state the column was operated under the following conditions:

(a) supply of aqueous solution of o-sulfobenzoic acid (of 50% strength): 300 grams per hour, corresponding to 150 grams per hour of o-sulfobenzoic acid and 150 grams per hour of water;
(b) temperature at the head of the column: 70.5° C.;
(c) discharge at the head of the column: 160–165 grams of water per hour;
(d) discharge from the sump: 170 grams of reaction product per hour;
(e) supply of isobutyric acid 35 grams per hour.

The crude o-sulfobenzoic acid anhydride from the sump contained about 20% of isobutyric acid, which was separated by distillation under reduced pressure.

*Example 4*

In a plate-type column (see accompanying drawing) a mixture of benzene (boiling point 80.1° C.) and propionic acid (boiling point 141° C.) was distilled with total reflux. After the liquids had separated in the column in zone I (benzene) and zone II (propionic acid) according to their volatility, a solution of 70 parts of citraconic acid (methyl-maleic acid) in 35 parts of water was introduced into the upper part of zone II through inlet A. The water set free in the column was condensed at the head of the column together with the benzene, the organic phase was separated (benzene) and the water was discharged at C. The benzene was recycled into the column. Citraconic anhydride containing a little propionic acid was discharged from the sump. For maintaining the concentration of propionic acid in zone II the corresponding amount of propionic acid was supplied through conduit D.

In the equilibrium state the column was operated under the following conditions:

(a) supply of aqueous citraconic acid solution (of 66.7% strength): 165 grams per hour, corresponding to 110 grams of citraconic acid per hour and 55 grams of water per hour;
(b) temperature at the head of the column: 71° C.;
(c) discharge at the head of the column: 71 grams of water per hour;
(d) discharge from sump: 125 grams of crude citraconic anhydride per hour together with 25% of propionic acid;
(e) supply of propionic acid: 31 grams per hour.

*Example 5*

A plate-type column according to the drawing, in which two zones had formed by distillation of benzene and isovaleric acid with total reflux, was charged in the upper part of the isovaleric acid zone with a mixture of lactic acid and water containing 80% of lactic acid. The separated water was discharged at the head and the dehydrated product from the sump of the column as described in the preceding examples. For maintaining the concentration of isovaleric acid in zone II, the necessary amount of isovaleric acid was introduced through inlet D.

After having reached the equilibrium state, the column was operated under the following conditions:

(a) supply of lactic acid/water mixture (80% of lactic acid): 77.5 grams per hour;
(b) temperature at the head of the column: 75° C.;
(c) discharge at the head of the column: 25.5 grams of aqueous phase per hour;
(d) discharge from the sump: 86 grams per hour of a mixture of polylactic acid containing 28% of isovaleric acid;
(e) supply of isovaleric acid: 24 grams per hour.

The aqueous phase discharge at the head contained 2% of acetic acid, originating from the lactic acid used. For separating the isovaleric acid the sump product was subjected to a simple distillation under reduced pressure whereby 62 grams of polylactic acid having the formula

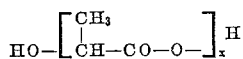

were obtained as residue from 86 grams of sump product.

We claim:

1. A process for continuously dehydrating an organic acid selected from the group consisting of maleic, phthalic, citraconic, succinic, glutaric and o-sulfobenzoic acids which comprises continuously introducing said acid into a distillation zone comprising a lower portion containing a liquid organic solvent for said acid and the dehydrated acid, said solvent having a boiling point which is at least about 20° C. lower than that of the dehydrated acid and being selected from the group consisting of saturated aliphatic acids of from 3 to 6 carbon atoms, dialkyl ethers of from 6 to 12 carbon atoms, acyclic ketones of up to 12 carbon atoms, and cyclic ketones of 5 and 6 carbon atoms, and an upper portion containing a liquid organic entrainer for water, said entrainer having a boiling point which is lower than the boiling point of the solvent and being selected from the group consisting of saturated aliphatic, cycloaliphatic and aromatic hydrocarbons of 5 to 10 carbon atoms and chlorinated hydrocarbons of one to two carbon atoms and at least two chlorine atoms; heating said acid, solvent and entrainer to a temperature in the range of 20 to 350° C. to transfer water from the acid to the entrainer and to remove vaporized water and entrainer from the top of the distillation zone; and continuously removing the dehydrated acid from the lower portion of the reaction zone.

2. The process of claim 1, wherein the solvent is propionic acid, n-butyric acid, iso-butyric acid, iso-valeric acid or trimethylacetic acid.

3. A process for the manufacture of maleic anhydride by dehydrating maleic acid, which comprises continuously introducing maleic acid into a reaction zone having a lower portion containing boiling isobutyric acid and an upper portion containing boiling benzene, whereby water is removed from the maleic acid in contact with the boiling isobutyric acid by forming an azeotrope with the benzene, distilling off the azeotrope and continuously withdrawing maleic anhydride from the lower portion of the reaction zone.

4. The process of claim 3, wherein the maleic acid is aqueous maleic acid.

5. A process for the manufacture of o-sulfobenzoic anhydride by dehydrating o-sulfobenzoic acid, which comprises continuously introducing o-sulfobenzoic acid into a reaction zone having a lower portion containing boiling isobutyric acid and an upper portion containing boiling benzene, whereby water is removed from the o-sulfobenzoic acid in contact with the boiling isobutyric acid, the resulting o-sulfobenzoic anhydride is retained by the isobutyric acid and the water forms an azeotrope with the benzene, distilling off the azeotrope and isolating o-sulfobenzoic anhydride from the lower portion of the reaction zone.

References Cited
UNITED STATES PATENTS

| | | | |
|---|---|---|---|
| 2,166,556 | 7/1939 | Spence et al. | 260—346.8 |
| 2,789,988 | 4/1957 | Brown et al. | 260—346.7 |

NICHOLAS S. RIZZO, *Primary Examiner.*